US012647282B2

(12) United States Patent
Pettit

(10) Patent No.: US 12,647,282 B2
(45) Date of Patent: *Jun. 2, 2026

(54) GENERATING DIGITAL SIGNATURE SHARES

(71) Applicant: nChain Licensing AG, Zug (CH)

(72) Inventor: Michaella Pettit, London (GB)

(73) Assignee: nChain Licensing AG, Zug (CH)

( * ) Notice: Subject to any disclaimer, the term of this patent is extended or adjusted under 35 U.S.C. 154(b) by 46 days.

This patent is subject to a terminal disclaimer.

(21) Appl. No.: 18/682,087

(22) PCT Filed: Jul. 11, 2022

(86) PCT No.: PCT/EP2022/069249
§ 371 (c)(1),
(2) Date: Feb. 7, 2024

(87) PCT Pub. No.: WO2023/016729
PCT Pub. Date: Feb. 16, 2023

(65) Prior Publication Data
US 2024/0372732 A1    Nov. 7, 2024

(30) Foreign Application Priority Data
Aug. 9, 2021    (GB) ...................................... 2111440

(51) Int. Cl.
*H04L 29/06* (2006.01)
*H04L 9/00* (2022.01)
(Continued)

(52) U.S. Cl.
CPC ............ *H04L 9/3255* (2013.01); *H04L 9/085* (2013.01); *H04L 9/3242* (2013.01); *H04L 9/50* (2022.05)

(58) Field of Classification Search
CPC ......... H04L 9/3255; H04L 9/50; H04L 9/085; H04L 9/3242; H04L 9/0816;
(Continued)

(56) References Cited

U.S. PATENT DOCUMENTS

| 7,246,232 B2 | 7/2007 | Dutertre |
| 8,144,874 B2 | 3/2012 | McGough |

(Continued)

FOREIGN PATENT DOCUMENTS

| JP | H11239124 A | 8/1999 |
| JP | 2007124032 A | 5/2007 |

(Continued)

OTHER PUBLICATIONS

Dikshit P., et al., "Efficient Weighted Threshold ECDSA for Securing Bitcoin Wallet," 2017 ISEA Asia Security and Privacy (ISEASP), IEEE, Jan. 29, 2017, pp. 1-9, DOI: 10.1109/ISEASP.2017.7976994.
(Continued)

*Primary Examiner* — Malcolm Cribbs
(74) *Attorney, Agent, or Firm* — Galvani Smith PLLC

(57) ABSTRACT

A computer-implemented method of generating a respective signature share of a digital signature for signing a message, wherein the method is performed by a first participant of the group and comprises: obtaining at least the threshold number of respective participant indexes, wherein the obtained respective participant indexes comprises a first participant index associated with the first participant; generating a private key index, wherein the private key index is generated based on a hash of a combination of the obtained respective participant indexes; generating a second common private key of the first hierarchical key structure; and generating a first signature share of the digital signature.

20 Claims, 4 Drawing Sheets

(51) Int. Cl.
    *H04L 9/08*         (2006.01)
    *H04L 9/32*         (2006.01)
(58) Field of Classification Search
    CPC ... H04L 9/0861; H04L 9/0872; H04L 9/3247;
            H04L 63/12; H04L 63/123; H04L 63/126;
                    G06F 21/64; G06F 21/645
    See application file for complete search history.

(56) References Cited

U.S. PATENT DOCUMENTS

| | | | |
|---|---|---|---|
| 8,806,197 B2* | 8/2014 | Struik | H04L 9/3252 |
| | | | 713/168 |
| 9,813,244 B1 | 11/2017 | Triandopoulos et al. | |
| 9,894,151 B2 | 2/2018 | Dhuse et al. | |
| 10,211,981 B2 | 2/2019 | Camenisch et al. | |
| 10,491,404 B1 | 11/2019 | Yamamoto | |
| 10,511,436 B1 | 12/2019 | Machani | |
| 10,764,043 B2 | 9/2020 | Traynor et al. | |
| 10,903,991 B1* | 1/2021 | Craige | H04L 9/085 |
| 11,323,267 B1 | 5/2022 | Griffin et al. | |
| 11,481,761 B2* | 10/2022 | Lam | H04L 9/14 |
| 11,563,567 B2 | 1/2023 | Le Saint | |
| 11,637,708 B2* | 4/2023 | Hung | H04L 9/3247 |
| | | | 713/168 |
| 11,973,867 B2 | 4/2024 | Tysor et al. | |
| 12,309,196 B2 | 5/2025 | Pettit | |
| 2002/0116611 A1 | 8/2002 | Zhou et al. | |
| 2003/0009694 A1 | 1/2003 | Wenocur et al. | |
| 2003/0059041 A1 | 3/2003 | Mackenzie et al. | |
| 2010/0037055 A1 | 2/2010 | Fazio et al. | |
| 2011/0138192 A1 | 6/2011 | Kocher et al. | |
| 2012/0254619 A1* | 10/2012 | Dhuse | H04L 67/1097 |
| | | | 713/176 |
| 2014/0164769 A1 | 6/2014 | D'Souza | |
| 2014/0325309 A1 | 10/2014 | Resch | |
| 2015/0100781 A1 | 4/2015 | Yann et al. | |
| 2015/0288525 A1 | 10/2015 | Camenisch et al. | |
| 2017/0223008 A1 | 8/2017 | Camenisch et al. | |
| 2017/0250972 A1 | 8/2017 | Ronda et al. | |
| 2018/0060248 A1 | 3/2018 | Liu et al. | |
| 2018/0074889 A1 | 3/2018 | Resch et al. | |
| 2018/0101697 A1 | 4/2018 | Rane et al. | |
| 2018/0183601 A1 | 6/2018 | Campagna et al. | |
| 2018/0212772 A1 | 7/2018 | Leavy et al. | |
| 2018/0307573 A1 | 10/2018 | Abraham et al. | |
| 2018/0349867 A1 | 12/2018 | Trieflinger | |
| 2018/0351754 A1 | 12/2018 | Wallrabenstein et al. | |
| 2019/0007205 A1 | 1/2019 | Corduan et al. | |
| 2019/0014124 A1 | 1/2019 | Reddy et al. | |
| 2019/0280864 A1 | 9/2019 | Cheng et al. | |
| 2019/0370792 A1 | 12/2019 | Lam | |
| 2019/0372759 A1 | 12/2019 | Rix | |
| 2020/0005290 A1 | 1/2020 | Madisetti et al. | |
| 2020/0044863 A1 | 2/2020 | Yadlin et al. | |
| 2020/0074450 A1 | 3/2020 | Fletcher et al. | |
| 2020/0145231 A1 | 5/2020 | Trevethan | |
| 2020/0153640 A1 | 5/2020 | Ranellucci | |
| 2020/0169391 A1 | 5/2020 | Kapp et al. | |
| 2020/0213099 A1 | 7/2020 | Wright | |
| 2020/0213113 A1 | 7/2020 | Savanah et al. | |
| 2020/0259638 A1 | 8/2020 | Carmignani et al. | |
| 2020/0259651 A1 | 8/2020 | Mohassel et al. | |
| 2020/0311678 A1 | 10/2020 | Fletcher et al. | |
| 2020/0353167 A1 | 11/2020 | Vivek et al. | |
| 2020/0389306 A1 | 12/2020 | Dolan et al. | |
| 2021/0049600 A1 | 2/2021 | Spector | |
| 2021/0067345 A1* | 3/2021 | Shamai | H04L 9/085 |
| 2021/0089676 A1 | 3/2021 | Ford et al. | |
| 2021/0090072 A1* | 3/2021 | Sewell | H04L 9/0618 |
| 2021/0352054 A1 | 11/2021 | Urian | |
| 2021/0359843 A1 | 11/2021 | Li et al. | |
| 2021/0377049 A1 | 12/2021 | Nix | |
| 2022/0172180 A1 | 6/2022 | Komiyama | |
| 2022/0182235 A1 | 6/2022 | Tysor et al. | |
| 2022/0239509 A1 | 7/2022 | Jang et al. | |
| 2022/0286276 A1 | 9/2022 | Li et al. | |
| 2022/0311623 A1 | 9/2022 | Tomlinson | |
| 2022/0321340 A1 | 10/2022 | Tsitrin | |
| 2023/0066711 A1* | 3/2023 | Wright | H04L 9/3247 |
| 2023/0361993 A1 | 11/2023 | Camenisch et al. | |
| 2024/0054206 A1* | 2/2024 | Belgarric | G06F 21/64 |

FOREIGN PATENT DOCUMENTS

| | | | |
|---|---|---|---|
| JP | 2008199278 A | 8/2008 | |
| JP | 2013513312 A | 4/2013 | |
| JP | 2015194959 A | 11/2015 | |
| JP | 2018005089 A | 1/2018 | |
| JP | 2019507539 A | 3/2019 | |
| WO | 9937052 A1 | 7/1999 | |
| WO | 2015160839 A1 | 10/2015 | |
| WO | 2017145010 A1 | 8/2017 | |
| WO | 2018189656 A1 | 10/2018 | |
| WO | 2019034951 A1 | 2/2019 | |
| WO | 2019034986 A1 | 2/2019 | |
| WO | 2019158209 A1 | 8/2019 | |
| WO | 2019193452 A1 | 10/2019 | |
| WO | 2019246206 A1 | 12/2019 | |
| WO | 2020084418 A1 | 4/2020 | |
| WO | 2021213959 A1 | 10/2021 | |
| WO | 2021254702 A1 | 12/2021 | |
| WO | 2023072502 A1 | 5/2023 | |

OTHER PUBLICATIONS

International Search Report and Written Opinion for International Application No. PCT/EP2022/076636, mailed Jan. 20, 2023, 12 pages.

Cachin Christian, "Security and Fault-tolerance in Distributed Systems—Distributed Cryptography", Dec. 31, 2012 (Dec. 31, 2012), XP055903112, Retrieved from the Internet: URL: https://cachin.com/cc/sft12/distcrypto.pdf, sections 7.2, 7.3, 7.4.

Combined Search and Examination Report for Application No. GB2009062.7, mailed on Mar. 12, 2021, 10 pages.

Combined Search and Examination Report under Sections 17 and 18(3) for Application No. GB2011686.9, mailed on Apr. 22, 2021, 10 pages.

Combined Search and Examination Report under Sections 17 and 18(3) for Application No. GB2017103.9 mailed on Jun. 28, 2021, 13 pages.

Combined Search and Examination Report under Sections 17 and 18(3) for Application No. GB2105992.8 mailed on Jan. 17, 2022, 9 pages.

Combined Search and Examination Report under Sections 17 and 18(3) for Application No. GB2111440.0 mailed on Jan. 25, 2022, 6 pages.

Combined Search Report under Sections 17 for Application No. GB2111442.6 mailed on Jan. 25, 2022, 4 pages.

Damgard I., et al., "Fast Threshold ECDSA with Honest Majority", Aug. 23, 2020, Computer Vision—ECCV2020: 16th European Conference, Proceedings; Part of the Lecture Notes in Computer Science, 35 pages.

Denis Kolegov et al: "Towards Threshold Key Exchange Protocols", arxiv.org, Cornell University Library, 201 Olin Library Cornell University Ithaca, NY 14853, Dec. 27, 2020 (Dec. 27, 2020), XP081849900, section 2.2.

Fornaro D., "Elliptic Curve Hierarchical Deterministic Private Key Sequences: Bitcoin Standards and BestPractices," Master Thesis, Apr. 19, 2018, retrieved from the URL: https://www.politesi.polimi.it/bitstream/10589/140112/1/2018_04_Fornaro.pdf, 53 pages.

GB2101590.4 Combined Search and Examination Report dated Jul. 30, 2021,7 pages.

Gennaro R., et al., "Fast Multiparty Threshold ECDSA with Fast Trustless Setup," Proceedings of the 2018 ACM SIGSAC Conference on Computer and Communications Security, Oct. 2018, pp. 1179-1194.

Gennaro R., et al., "Robust Threshold DSS Signatures," International Conference on the Theory and Applications of Cryptographic Techniques, 1996, EUROCRYPT '96 pp. 354-371.

(56)                References Cited

OTHER PUBLICATIONS

Gennaro R., et al., "Robust Threshold DSS Signatures," International Conference on the Theory and Applications of Cryptographic Techniques, 2001, vol. 164, pp. 54-84.

Goldfeder S., et al., "Securing Bitcoin Wallets via Threshold Signatures," 2014, retrieved from the URL: https://www.cs.princeton.edu/stevenag/bitcoin_threshold_signatures.pdf, sections "Threshold ECDSA Signature Generation" and "Threshold Deterministic Address Derivation", 11 pages.

International Search Report and Written Opinion for Application No. PCT/EP2021/062941, mailed on Aug. 3, 2021, 14 pages.

International Search Report and Written Opinion for Application No. PCT/EP2021/076686 mailed on Feb. 14, 2022, 17 pages.

International Search Report and Written Opinion for Application No. PCT/EP2022/058085 mailed on Jul. 26, 2022, 14 pages.

International Search Report and Written Opinion issued in International Application No. PCT/EP2021/067673, mailed on Sep. 28, 2021, 13 pages.

Joonsang Baek et al: "Simple and efficient threshold cryptosystem from the gap diffie-hell ma n group", GLOBECOM '03. 2003—IEEE Global Telecommunications Conference. Conference Proceedings. San Francisco, CA, Dec. 1-5, 2003; [IEEE Global Telecommunications Conference] New York, NY, vol. 3, Dec. 1, 2003 (Dec. 1, 2003), pp. 1491-1495,.

Luzio A.D., et al., "Arcula: A Secure Hierarchical Deterministic Wallet for Multi-asset Blockchains," Section 2, Dec. 10, 2019, 33 pages.

PCT/EP2022/050116 International Search Report and Written Opinion dated Apr. 26, 2022, 14 pages.

Pettit M. "Shared Secrets and Threshold Signatures," May 1, 2020, [retrieved on Jun. 14, 2021], pp. 1-23, Retrieved from the Internet: URL: https://nakasendoproject.org/Threshold-Signatures-whitepaper-nchain.pdf, sections 4 and 5; p. 22.

Pramanik S., et al., "VPSS: A Verifiable Proactive Secret Sharing Scheme in Distributed Systems," IEEE Military Communications Conference, Milcom, Oct. 13, 2003, vol. 2, pp. 826-831, XP010698401, DOI: 10.1109/ MILCOM.2003.1290219, ISBN: 978-0-7803-8140-7.

Wuille P., "BIP 32: Hierarchical Deterministic Wallets," Github Bitcoin BIPs, Feb. 2012, 6 pages, Retrieved from the Internet: URL: https://en.bitcoin.it/wiki/BIP_0032, Retrieved on Aug. 24, 2020.

International Search Report and Written Opinion for Application No. PCT/EP2022/069246 dated Nov. 3, 2022, 15 pages.

Combined Search and Examination Report under Sections 17 and 18(3) for Application No. GB2111441.8 mailed on Jan. 25, 2022, 6 pages.

Ewa Syta et al: "Keeping Authorities "Honest or Bust" with Decentralized Witness Cosigning", 2016 IEEE Symposium on Security and Privacy (SP) , May 1, 2016 (May 1, 2016), pp. 526-545.

Hideyuki F., et al., "Updating Method of Distributed Data in Secret Sharing System," Research Report of Computer Security (CSEC), Japan, Information Processing Society of Japan, May 15, 2014, vol. 2014-CSEC-65, No. 1, pp. 1-6, 10 pages.

Shingu T., et al., "Updating Method of Verifiable Distributed Data in the Secret Sharing Scheme," Japan, Information Processing Society of Japan, Nov. 28, 2014, vol. 2014-CSEC-67, No. 5, pp. 1-6, 9 pages.

Boldyreva A., et al., "Threshold Signatures, Multisignatures and Blind Signatures Based on the Gap-diffie-hellman-group Signature Scheme," International Workshop on Public Key Cryptography, Berlin, Heidelberg: Springer Berlin Heidelberg, 2003, 16 pages.

Camenisch J., et al., "Short Threshold Dynamic Group Signatures," International conference on security and cryptography for networks Cham: Springer International Publishing, 2020, pp. 401-423.

Courtois N.T., et al., "Stealth Address and Key Management Techniques in Blockchain Systems," Proceedings of the 3rd International Conference on Information Systems Security and Privacy (ICISSP 2017), Feb. 21, 2017, pp. 559-566.

EP Application No. 25202983.0 Extended European Search Report dated Jan. 8, 2026, 10 pages.

KR Application No. 10-2023-7013703 Office Action dated Feb. 18, 2026, 3 pages.

* cited by examiner

300

S301
Obtain participant Indexes

S302
Generate private key index

S303
Generate common private key

S304
Generate signature share

S305
Generate signature

Figure 4

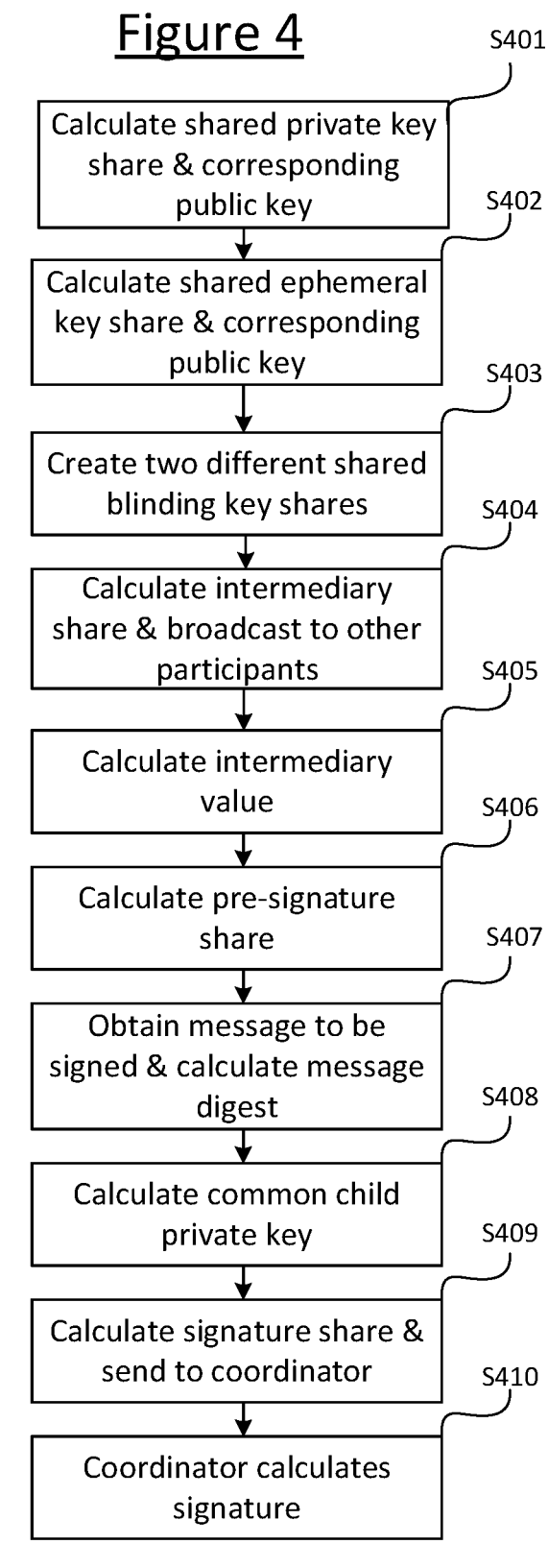

S401
Calculate shared private key share & corresponding public key

S402
Calculate shared ephemeral key share & corresponding public key

S403
Create two different shared blinding key shares

S404
Calculate intermediary share & broadcast to other participants

S405
Calculate intermediary value

S406
Calculate pre-signature share

S407
Obtain message to be signed & calculate message digest

S408
Calculate common child private key

S409
Calculate signature share & send to coordinator

S410
Coordinator calculates signature

400

GENERATING DIGITAL SIGNATURE SHARES

CROSS REFERENCE TO RELATED APPLICATIONS

This application is the U.S. National Stage of International Application No. PCT/EP2022/069249 filed on Jul. 11, 2022, which claims the benefit of United Kingdom Patent Application No. 2111440.0, filed on Aug. 9, 2021, the contents of which are incorporated herein by reference in their entireties.

TECHNICAL FIELD

The present disclosure relates to a method of generating shares of a digital signature. In particular, the method enables a participant to prove that they have generated a share of the digital signature.

BACKGROUND

In general, a shared secret may be used to share a data item that is distributed amongst a group of participants. Each participant has a different share of the secret. Normally, the secret can only be reconstructed when a certain number (referred to as the "threshold") of participants make their respective shares available, e.g. to be combined together to calculate the secret.

Public-key cryptography is a type of cryptographic system that uses pairs of keys: private keys which are known only to the owner of the private key, and public keys which are generated based on the corresponding private key and which may be disseminated without compromising the security of the private key.

Public-key cryptography enables a sender to encrypt a message using a recipient's public key (i.e. the public key corresponding to a private key known only to the recipient). The encrypted message can then only be decrypted using the recipient's private key.

Similarly, a sender can use their own private key to sign a message, e.g. to prove that the message is being sent by the sender, and/or to indicate that the sender agrees with the message. The signer (i.e. the party generating the signature) uses their private key to create a digital signature based on the message. Creating a digital signature based on a message means supplying the message and private key to a function that generate the signature based on both the message and private key. The signature is added to (e.g. tagged onto) the message or otherwise associated with the message. Anyone with the signer's corresponding public key can use the same message and the digital signature on the message to verify whether the signature was validly created, i.e. whether the signature was indeed made using the signer's private key. As well as ensuring the authenticity of a message, digital signatures also ensure the integrity and non-repudiation of the message. That is, a digital signature can be used to prove that a message has not been changed since it was signed with the signature, and that the creator of a signature cannot deny in the future that they created the signature.

A digital signature scheme typically involves three procedures, i.e. algorithms. A key generation algorithm is used to generate a random private key and a corresponding public key. A signing algorithm is used to generate a signature based on a message and the private key. A verification algorithm is used to verify, given a public key and the message, whether the signature has been generated using the corresponding private key and according to the signing algorithm.

A common use of a shared secret is as a shared private key of a private-public key pair. That is, the private key may be distributed amongst a group of participants such that no single participant has access to the private key. Therefore no single participant can generate a valid signature of a message. Instead, some or all of the participants must together generate the private key in order for the signature to be generated.

Instead of the participants sharing their private key shares in order to generate a signature, they may instead use a threshold signature scheme. A threshold signature scheme allows a threshold number of participants in a group to create a digital signature based on a message using individual shares of a shared private key, without the private key being made available to any one participant. Here, a digital signature is a signature which is generated based on the message to be signed. In such a scheme, the signature can only be created if the threshold number of participants agree to generate the signature on the message. Any attempt to generate a signature using a smaller number of participants will not generate a valid signature. Therefore, a valid signature by the group (i.e. one generated using the message and the shared private key) provably had the threshold number of people agree to generate the signature. This also implies that any adversary needs to obtain the threshold number of shares of the private key to forge a signature with that private key.

SUMMARY

As mentioned above, threshold signature schemes require participants to contribute respective signature shares in order to generate a valid signature. Whilst a valid signature proves that at least a threshold number of participants contributed a signature share, it does not prove which participants of the group contributed a signature share. In other words, in a threshold signature scheme, there is no way to identify who has created a given signature—the resulting signature will always be the same no matter which shares were used to create it. There is therefore a need for a threshold signature scheme which allows signers (i.e. participants that contribute a signature) to be able to prove that they have indeed contributed a signature share.

According to one aspect disclosed herein, there is provided a computer-implemented method of generating a respective signature share of a digital signature for signing a message, wherein each participant of a group of participants has i) a respective private key share of a shared private key, wherein the shared private key can only be generated with at least a threshold number of respective private key shares, ii) a respective ephemeral private key share of a shared ephemeral private key, iii) a first co-ordinate of an ephemeral public key corresponding to the shared ephemeral private key, and iv) a first common private key of a first hierarchical key structure, wherein each participant is associated with a respective participant index, and wherein the method is performed by a first participant of the group and comprises: obtaining at least the threshold number of respective participant indexes, wherein the obtained respective participant indexes comprises a first participant index associated with the first participant; generating a private key index, wherein the private key index is generated based on a hash of a combination of the obtained respective participant indexes; generating a second common private key of the first hierarchical key structure, wherein the second common private key is generated based on the first common private key and a first hash value, wherein the first hash value is generated by inputting at least a) the first common private key or a corresponding public key and b) the private key index into a hash function; and generating a first signature share of the digital signature, wherein the first signature shared is generated based on a first ephemeral key share, the message, the second common private key, the first co-ordinate of the ephemeral public key, and a first private key share.

A key structure, of which a hierarchical deterministic (HD) wallet is an example, is a collection of deterministically linked private keys, where at least some of the keys are associated with different levels and positions within the hierarchical structure. For instance, a master private key sits at the top of the hierarchy (i.e. level 0), with one or more child keys at the next level (i.e. level 1). Each child key at level 1 is linked to the master private key. Each child key at level 1 may be linked to one or more respective sets of child keys at level 2. Therefore whilst being children of the master key, the child keys of level 1 may also be parents to child keys of level 2. It will be appreciated that a HD wallet may contain any number of levels and keys. Each child key in the key structure is generated based on the parent key and an index (referred to herein as a "private key index" or a "key index"). Each child key may also be generated based on additional data such as, for example, a chain code of the parent key. Chain codes per se are known in the art.

Embodiments of the present invention require each participant that contributes a signature share to generate the same child private key of the same key structure, where the respective signature share of each participant is generated using that same child private key. Each participant is associated with a respective participant index. The key index of the child private key is generated based on the respective participant index of each participant that contributes a signature share. For instance, if participants 1, 3 and 5 (intend to) contribute signature shares, the key index of the child private key is generated based on participant indexes 1, 3 and 5. The key index is generated by hashing a combination (e.g. summation or concatenation) of the participant indexes.

Each signature share is also generated based on the respective share of the shared private key. Thus the shared private key is used to enforce the threshold aspect of the threshold scheme. As will be discussed, the signing key (i.e. the private key that corresponds to the signature) is based on the shared private key (that no individual participant has access to) and the child private key that is common to each participant. A participant ("proving party") can prove, to a verifying party, that the common child private key was generated using a key index based on the respective participant index of the proving party. Thus the proving party can identify themselves as a signing party. This can be used to prevent other participants falsely claiming that they have contributed to the signature, or that the proving party has not contributed to the signature.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 4 is a flow diagram illustrating an example signature generation method according to some embodiments of the present invention.

DETAILED DESCRIPTION OF EMBODIMENTS

1. Cryptographic Preliminaries

Figure 1:
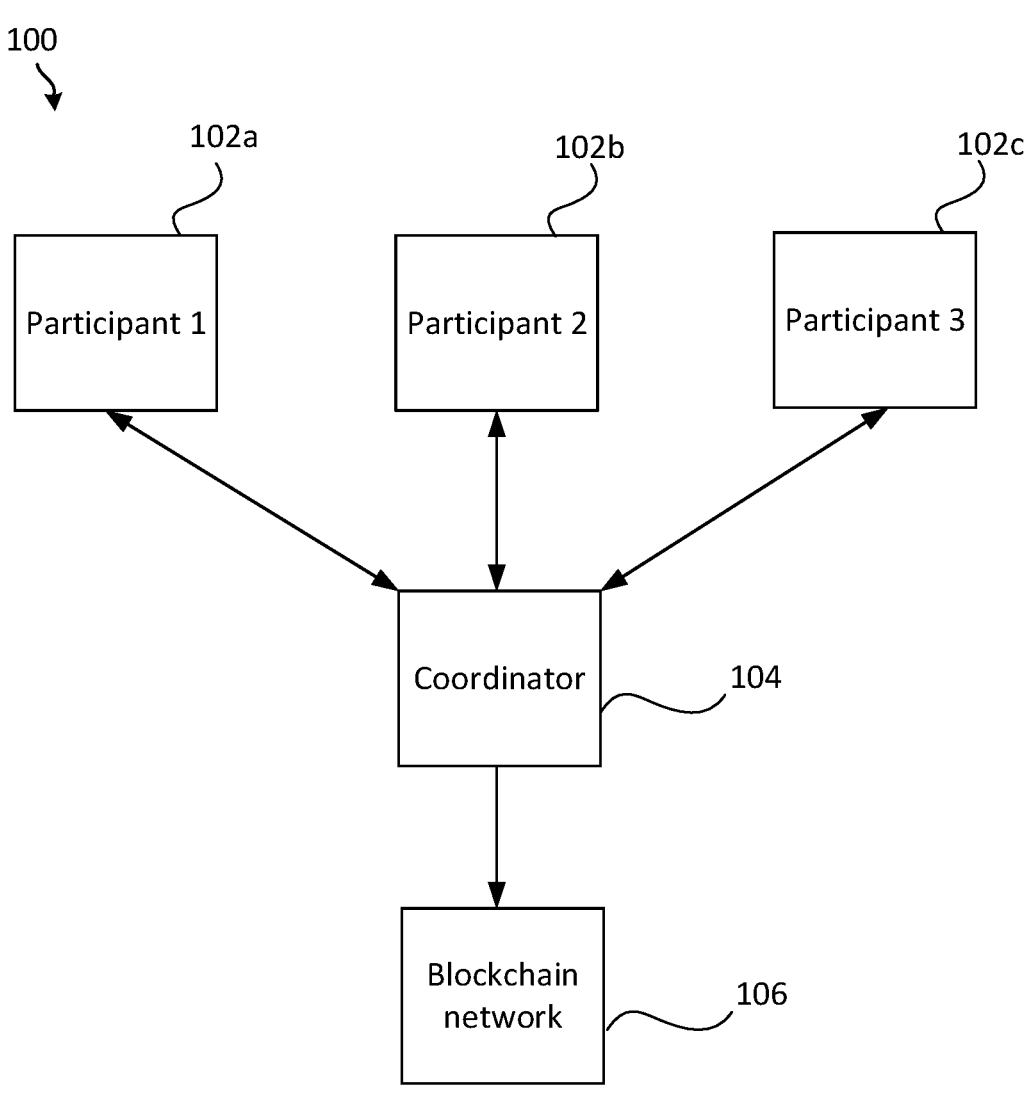
FIG. 1 is a schematic block diagram of a system for implementing embodiments of the present invention, and FIG. 2 schematically represents hierarchical deterministic key structure.

Whilst the following examples are described in terms of elliptic curve cryptography, the invention is not limited to any one particular cryptographic scheme and may in general be applied to any cryptographic scheme, e.g. RSA or other public key cryptography schemes.

1.1 Elliptic Curve Groups

An elliptic curve E satisfies the equation:

$$y^2 = x^3 + ax + b \bmod p$$

where a, b$\in \mathbb{Z}_p$ and a, b are constants satisfying $4a^3 + 27b^2 \neq 0$. The group over this elliptic curve is defined to be the set of elements (x, y) satisfying this equation along with the point at infinity $\mathcal{O}$, which is the identity element. The group operation on the elements in this group is called elliptic curve point addition and denoted by +. This group is denoted by $E(\mathbb{Z}_p)$ and its order by n.

This group operation can be used to define another operation on the elements called point multiplication denoted by ·. For a point $G \in E(\mathbb{Z}_p)$ and a scalar $$k \in \mathbb{Z}_n^*,$$

the point k·G is defined to be the point G added to itself k times.

In elliptic curve cryptography, a private key is defined to be a scalar $k \in \mathbb{Z}_n \backslash \{0\}$ where $\mathbb{Z}_n \backslash \{0\}$ is notation for the set $\{1, \ldots, n-1\}$, and the corresponding public key is the point k·G on an elliptic curve. For instance, in some blockchain protocols, the elliptic curve is chosen to be the secp256k1 elliptic curve, and the values a, b, and p are completely specified by this curve. The order n of this group has been calculated given these values, which in the case of this curve is a prime, and the secp256k1 standard also specifies a point G which is to be used as the generator of this group.

1.2 Elliptic Curve Digital Signature Algorithm

In order to create a signature on a message msg, with the private key a, the following steps are taken:

1. Calculate the message digest e=hash(msg), where may be any hash function. For instance, in some examples hash(msg)=SHA256(SHA256(msg)) where SHA256 (■) is the SHA-256 hash function. Note that instead the message may be hashed only once, or more that two times with the same or different hash functions.
2. Chose a random integer $k \in \{1, \ldots, n-1\}$, where n is the order of the elliptic curve, e.g. the secp256k1 curve. In the following, k is referred to as the ephemeral private key.
3. Calculate the ephemeral public key corresponding to this ephemeral private key k·G=$(R_x, R_y)$.
4. Calculate r=$R_x$ mod n. If r=0, return to step 2.

5. Calculate the multiplicative inverse of the ephemeral key $k^{-1}$ mod n.
6. Calculate $s=k^{-1}(e+ar)$ mod n. If s=0, return to step 2.
7. The signature on the message msg is (r, s).

The ephemeral key is kept secret, otherwise the private key can be calculated, given a message and signature. Additionally, each time a signature is generated, a different ephemeral key must be used. If this is not the case, it is possible to derive the private key a given two different signatures and their corresponding messages.

Given a message msg, a public key P=a·G, and corresponding signature (r, s), then one can verify the signature by completing the following steps:

1. Calculate the message digest e=hash(msg), e.g. e=SHA256(SHA256(msg)).
2. Calculate the multiplicative inverse $s^{-1}$ of s modulo n.
3. Calculate $j_1=es^{-1}$ mod n and $j_2=rs^{-1}$ mod n.
4. Calculate the point $Q=j_1 \cdot G+j_2 \cdot P$.
5. If Q=$\mathcal{O}$, the point at infinity, the signature is invalid.
6. If Q≠$\mathcal{O}$, then let $Q:=(Q_x, Q_y)$, and calculate $u=Q_x$ mod n. If u=r, the signature is valid.

In threshold signature schemes, this private key a is split into key shares that are distributed amongst participants in a threshold scheme group.

1.3 Joint Verifiable Random Secret Sharing

Assume that N participants want to create a joint secret that can only be regenerated by at least (t+1) of the participants in the scheme. To create the shared secret, the following steps are taken:

1. The participants agree on the unique label i for each participant. Each participant i generates (t+1) random numbers $$a_{ij} \in_R \mathbb{Z}_n \backslash\{0\}, \forall j = 0, ..., t,$$

where $\in_R$ means a randomly generated element of the set $\mathbb{Z}_n\backslash\{0\}$ where $\mathbb{Z}_n\backslash\{0\}$ is notation for the set $\{1, \ldots, n-1\}$. Then each participant has a secret polynomial of order t $$f_i(x) = a_{i0} + a_{i1}x + \cdots + a_{it}x^t \mod n,$$

for i=1, . . . , N. Note that we omit the mod n notation from now on, and it is assumed that all arithmetic operations over integers are done modulo n.
2. Each participant i sends the value $f_i(j)$ to participant j e.g. using a secure communication channel with participant j only.
3. Each participant i calculates their own private secret share of a shared secret polynomial as $$a_i := \sum_{j=1}^{N} f_j(i).$$

A shared secret share is a point with the form (i, $a_i$), where i is the participants label in the scheme. This method for creating a secret share of a, as described in steps 1-3, is denoted herein by $a_i$=JVRSS(i) for participant i. Note that "JVRSS" typically stands for "Joint verification random secret sharing" and includes steps 4 and 5 as well. However, throughout this document JVRSS is taken to mean performing at least steps 1 to 3, where steps 4 and 5 are optional steps.

Now that the participants have generated a shared polynomial, they can each verify that the other participants have shared the correct information to all participants, and that all participants have the same shared polynomial. This is done in the following way.

4. Each participant i broadcasts to all participants the obfuscated coefficients $$a_{ik} \cdot G,$$

for k=0, . . . , t.
5. Each participant i checks that each participant j has correctly calculated the polynomial point $f_j(i)$ by calculating $f_j(i) \cdot G$ and verifying that $$f_j(i) \cdot G \overset{?}{=} \sum_{k=0}^{t} i^k (a_{jk} \cdot G) \; \forall \; j = 1, \ldots, N.$$

If all participants find that this equation holds for each polynomial, then the group can collectively be sure that they have all created the same shared polynomial.

1.4 Reconstructing a Shared Secret

Assume a participant wants to reconstruct a shared secret a which is the zeroth order of a shared polynomial. Given (t+1) points on this polynomial of the form $$(1, a_1), \ldots, ((t+1), a_{t+1}),$$

then to find the shared secret a, one calculates $$\text{interpolate}(a_1, \ldots, a_{t+1}) = \left( \sum_{i=0}^{t+1} a_i \prod_{\substack{1 \leq j \leq (t+1), \\ j \neq i}} (-j)(l-j)^{-1} \right) = a,$$

which is derived from a general formula known as "Lagrange Interpolation".

1.5 Public Key Calculation

Given the N zeroth-order private polynomial coefficient public keys $a_{i0} \cdot G$ for j=1, . . . , N shared in step 4 of JVRSS, each participant calculates the shared public key P using $$P = a \cdot G = \sum_{j=1}^{N} a_{j0} \cdot G,$$

corresponding to the shared secret a.

1.6 Addition of Shared Secrets

To calculate the addition of two shared secrets that are shared amongst a group of N participants, where each secret polynomial has order t, without any entity knowing the individual secrets, the following steps are taken:

1. Generate the first shared secret a, where participant i's share is given by $a_i$=JVRSS(i) for i=1, . . . , N with a threshold of (t+1).

2. Generate the second shared secret b, where participant i's share is given by $b_i$=JVRSS(i), with a threshold of (t+1).

3. Each participant i calculates their own additive share $$v_i = a_i + b_i \bmod n.$$

4. All participants broadcast their additive share $v_i$ to all other participants.

5. Each participant interpolates over at least (t+1) of the shares $v_i$ to calculate $$v = \text{interpolate } (v_1, \ldots, v_{t+1}) = a + b.$$

This method for the addition of shared secrets is denoted by ADDSS(i) for participant i, which results in each participant i knowing v=(a+b).

1.7 Product of Shared Secrets

To calculate the product of two shared secrets that are both shared amongst a group of N participants, where each secret polynomial has order t, the group takes the following steps:

1. Generate the first shared secret a, where participant i's share is given by $a_i$=JVRSS(i) for i=1, . . . , N. The shared secret polynomial has order t, meaning (t+1) participants are required to recreate it.

2. Generate the second shared secret b, where participant i's share is given by $b_i$=JVRSS(i), and the shared secret polynomial again has order t.

3. Each participant calculates their own multiplicative share $\mu_i$ using $$\mu_i = a_i b_i.$$

4. All participants broadcast their multiplicative share $\mu_i$ to all other participants.

5. Each participant interpolates over at least (2t+1) of the shares $\mu_i$ at 0 to calculate $$\mu = \text{interpolate}(\mu_1, \ldots, \mu_{2t+1}) = ab.$$

This method for calculating the product of two shared secrets is denoted herein by $\mu$=ab=PROSS(i) for participant i.

1.8 Inverse of a Shared Secret

In order to calculate the inverse of a shared secret a, the following steps are taken:

1. All participants calculate the product of shared secrets PROSS(i), the result of which is $\mu$=ab mod n.

2. Each participant calculates the modular inverse of $\mu$ which results in $$\mu^{-1} = (ab)^{-1} \bmod n.$$

3. Each participant i calculates their own inverse secret share by calculating $$a_i^{-1} = \mu^{-1} b_i.$$

This method for calculating the inverse of shared secrets is denoted by $$a_i^{-1} = INVSS(i)$$

for participant i.

1.9 Shared Private Key Generation and Verification

To calculate a shared private key a between N≥2t+1 participants, t+1 of which are required to create a signature, the participants execute JVRSS with a threshold of t+1 and public key calculation as described above. The result is that every participant i=1, . . . , N has a private key share $a_i$ and the corresponding shared public key P=(a·G).

1.10 Ephemeral Key Shares Generation

To generate ephemeral key shares and the corresponding r, as is required in a signature, a group of size N with a shared private key a of threshold (t+1) execute the following steps:

1. Generate the inverse share of a shared secret $$k_i^{-1} = INVSS(i),$$

where (t+1) shares are required to recreate it.

2. Each participant calculates $$(x, y) = \sum_{i=1}^{N} (k_{i0} \cdot G),$$

using the obfuscated coefficients shared in the verification of $k_i$, then they calculate $$r = x \bmod n.$$

3. Each participant i stores $$(r, k_i^{-1}).$$

1.11 Non-Optimal Signature Generation

Assume that at least 2t+1 participants would like to create a signature on a message, and one of the participants chooses to coordinate this. In order to create a signature by a group with the shared private key a, the following steps are taken.

1. The coordinator requests a signature on the message from at least 2t+1 participants.

2. Each participant i recovers the ephemeral key $$(r, k_i^{-1})$$

calculated in the previous section. All users must use a share corresponding to the same ephemeral key.

3. Each participant calculates the message digest e=SHA-256(SHA-256(message)).

4. Each participant i calculates their own signature share $s_i$:

$$s_i = k_i^{-1}(e + a_i r) \bmod n,$$

where $a_i$ is their private key share.

5. Each participant sends their signature share (r, $s_i$) to the coordinator.

6. When the coordinator has received 2t+1 signature shares, they calculate:

$$s = \text{interpolate}(s_1, \ldots, s_{2t+1}),$$

and output the signature as (r, s).

7. The coordinator verifies the signature using the standard ECDSA verification. If this fails, at least one of the shares must be incorrect, and the signature generation algorithm should be run again.

1.12 Addition of Secrets With Different Thresholds

In the case of addition of secrets of order t and t', the addition of the two secrets requires max(t, t')+1 number of shares to calculate it. The reason behind this is that the addition step of the shares of the shared secrets creates a share of a new polynomial. This new additive polynomial is equivalent to the result of the addition of the individual polynomials of the two shared secrets. Adding two polynomials is adding the corresponding coefficients at each order of x. Therefore, the order of the additive polynomial must be the same order as the highest order of the two polynomials. This can be generalised to the addition of more than two polynomials, where the order of the resulting polynomial is the same as the order of the highest order individual polynomial.

Once the addition of two secrets with different thresholds has been calculated, the security of the higher threshold secret is reduced. This is because if one now knows the result (a+b) with respective thresholds t, t' and assume that t<t', then one can calculate a with t shares, and then calculate (a+b)−a=b, and so the value b has been calculated with only t shares. This lower threshold is referred to below as the 'implicated threshold' of b.

1.13 Multiplication of Secrets With Different Thresholds

In the case of multiplication of two secrets with a threshold of t and t', the calculation of the multiplication requires t+t'+1 shares. In this case, the multiplication of shares of two polynomials results in a share on a new polynomial. This new polynomial is the result of multiplying the two individual polynomials and so the order of the result is the addition of the order of the two individual polynomials.

Multiplication can also be generalised to any number of shared secrets, with the resulting threshold being the sum of the individual thresholds plus 1, $\Sigma_\rho t_\rho + 1$, where $\rho$ runs over the individual shared secrets.

Similar to addition, the multiplication of two secrets with different thresholds results in an implicated threshold of the higher threshold secret. As before, if ab is known where a has a threshold of t and b has a threshold of t', and t<t', then both a and b can be calculated with t shares. First, one can calculate a and using (ab)a$^{-1}$ find b with only t shares of a secret.

1.14 Combining the Addition and Multiplication of Shared Secrets in One Step It is possible to generalise the above to calculate any combination of addition and multiplication in one step. Assume a group of N participants want to calculate the result ab+c, where a, b, c are shared secrets with thresholds ($t_a$+1), ($t_b$+1), ($t_c$+1) respectively. There is a condition which is max($t_a$+$t_b$, $t_c$)<N, that is, the number of participants of the scheme must be greater than the maximum between the order of the secret c and the order of the result of the multiplication of the secrets a and b.

1. Each participant i calculates their secret shares $a_i$=JVRSS(i), $b_i$=JVRSS(i), $c_i$=JVRSS(i) with thresholds ($t_a$+1), ($t_b$+1), ($t_c$+1) respectively.

2. Each participant i calculates the share $\lambda_i = a_i b_i + c_i$.

3. Each participant i shares the result $\lambda_i$ with the other participants.

4. Each participant interpolates over max($t_a$+$t_b$, $t_c$)+1 shares to find the result $\lambda$=int($\lambda_1, \ldots, \lambda_i, \ldots$)=ab+c.

This is done in the calculation of a shared signature according to some embodiments below. That is, there is an interpolation over $$s_i = k_i^{-1}(e + a_i r).$$

This is essentially the case above with $$a_i b_i = k_i^{-1} a_i r \text{ and } c_i = k_i^{-1} e.$$

In this case $t_a$+$t_b$=2t and $t_c$=t, and interpolation is over max($t_a$+$t_b$, $t_c$)+1=2t+1 shares.

1.15 HD Wallets

Figure 2:
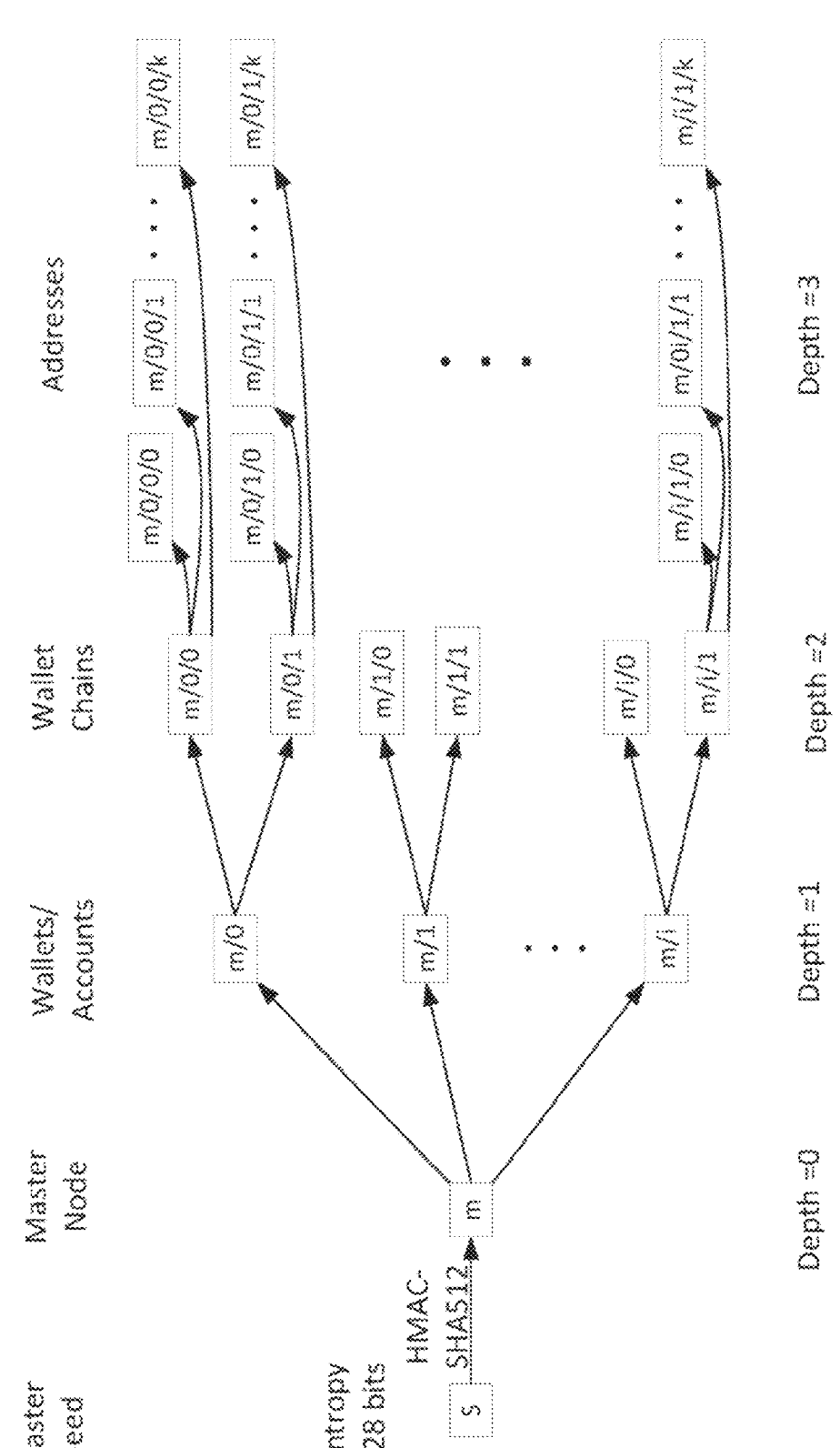

Hierarchical Deterministic wallets, of which a Bitcoin Improvement Proposal 32 (BIP32) wallet is a particular type, are deterministic wallets where many keys can be derived from a single input. The input is some random entropy called the seed, from which a master key is derived. The master key is then used to derive multiple child keys, as shown in FIG. 2.

In BIP32 the master private key is the left 32 bytes of the result of the HMAC-SHA512 of the seed, or explicitly, it is $$sk_{master} = HMAC\text{-}SHA512_L(\text{'Bitcoin Seed'}, \text{seed}),$$

and the chain code is $$c_{master} = HMAC\text{-}SHA512_R(\text{'Bitcoin Seed'}, \text{seed}),$$

and all child keys can be then derived from these, where $$HMAC - SHA512(c, K) = SHA512(c \oplus opad \| SHA512((c \oplus ipad) \| K))$$

is the HMAC using the SHA512 hash function. In the equation above, opad is the block-sized outer padding, and ipad is the block-sized inner padding.

A HMAC requires two inputs, i.e. c and K. For simplicity and so that users are only required to remember or store a single seed, the BIP32 protocol sets the first input as the string 'Bitcoin Seed', i.e. c='Bitcoin Seed' It will be appreciated that this is one example protocol for generating a HD wallet and that different protocols may require different inputs, e.g. two randomly generated seeds. In other words, the use of the string 'Bitcoin Seed' is not a necessary requirement for generating a HD wallet.

The equation for calculating a hardened child private key $sk_{child}$ from a parent private key $sk_{parent}$ is $$sk_{child} = sk_{parent} + HMAC\text{-}SHA512_L(c_{parent}, sk_{parent} \| index),$$

where $c_{parent}$ is the parent chain code, $0 \leq index < 2^{31}$ is the child index, and HMAC-SHA512$_L$ is the left 32 bytes of the result of the HMAC function calculated with the SHA-512 hash function. The corresponding equation for the child public key is derived by simply point multiplying this equation by the base point G.

The equation for calculating a non-hardened child private key $sk_{child}$ from a parent public key $pk_{parent}$ and parent private key $sk_{parent}$ is $$sk_{child} = sk_{parent} + HMAC\text{-}SHA512_L(c_{parent}, sk_{parent} \| index),$$

where $c_{parent}$ is the parent chain code, $2^{31} \leq index < 2^{32}$ is the child index, and HMAC-SHA512 is the HMAC function calculated with the SHA-512 hash function. This second type of child key allows for child public keys to be derived by anyone with knowledge of the parent public key and chain code using the equation $$pk_{child} = pk_{parent} + HMAC\text{-}SHA512_L(c_{parent}, sk_{parent} \| index) \cdot G.$$

This can be used by external parties to derive various payment addresses as required, avoiding key reuse, whilst reducing rounds of communication and storage.

In general, an HD wallet should generate some hierarchical tree-like structure of private-public key pairs. This provides a high number of key pairs that can all be regenerated from one seed.

2. Generating Signature Shares

FIG. 1 illustrates an example system 100 for implementing embodiments of the invention. As shown, the system 100 comprises a plurality of parties (also referred to below as "participants") 102. Only three participants 102*a*, 102*b*, 102*c* are shown in FIG. 1, but it will be appreciated that in general the system may comprise any number of participants.

The system 100 also comprises a coordinating party 104 (or simply, "coordinator"), who may or may not also be one of the participants 102. Each of the participants 102 and the coordinating party 104 operates respective computing equipment.

Each of the respective computing equipment comprises respective processing apparatus comprising one or more processors, e.g. one or more central processing units (CPUs), accelerator processors such a graphics processing units (GPUs), other application specific processors, and/or field programmable gate arrays (FPGAs). The respective computing equipment may also comprise memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive. The respective computing equipment may comprise at least one user terminal, e.g. a desktop or laptop computer, a tablet, a smartphone, or a wearable device such as a smartwatch. Alternatively or additionally, the respective computing equipment may comprise one or more other networked resources, such as cloud computing resources accessed via the user terminal (the cloud computing resources comprising resources of one or more physical server devices implemented at one or more sites). It will be appreciated that any act described as being performed by a party of the system 100 may be performed by the respective computing apparatus operated by that party.

Each of the participants 102 may be configured to transmit data to one, some or all of the other participants 102 over a network such as the Internet using a LAN or WAN connection, or via alternative wired or wireless communication means. Unless the context requires otherwise, reference to a participant 102 transmitting data may be understood as transmitting data to other participants 102 individually, e.g. via a secure communication channel between the first participant 102*a* and the second participant 102*b*, or broadcasting to the group as a whole, e.g. via email or other means. Again, unless the context requires otherwise, each participant 102 may transmit data in raw form, or in encrypted form. For instance, the data may be encrypted using a public key of a recipient participant before being sent to that recipient participant. The same applies to the coordinator 104 transmitting and receiving data to one, some or all of the participants 102.

Embodiments of the present invention will primarily be described from the perspective of the first participant 102*a*. However it will be appreciated that in general steps of the described method may similarly be performed by other participants, e.g. the second participant 102*b* or third participant 102*c*. It will also be appreciated that the terms "first", "second", "third" and so on are used herein merely as distinguishing labels and do not necessarily imply an order, unless the particular context in which the terms are used requires otherwise.

The present invention enables each participant 102 of a group of participants 102 to generate respective shares of a threshold signature.

Each participant 102 has access to (e.g. stores in memory of their respective computing equipment) a respective share of a shared private key. These private keys shares may be generated using a secret sharing scheme such as, for example, JVRSS (described above) or Shamir's Secret Sharing Scheme (SSSS). Alternative schemes for generating shares of a shared private key may be used. Each participant 102 also has access to a respective share of a shared ephemeral private key. The ephemeral private key shares may be generated using JVRSS, SSSS or an alternative scheme. Each participant 102 may also have access to the inverse of their respective ephemeral private key share, or the inverse may be generated when needed, e.g. using the INVSS function described above. Each participant also has access to an ephemeral public key, i.e. a public key corresponding to the shared ephemeral private key. As is known in the art, a public key comprises first (x) and second (y) co-ordinates and, as will be discussed below, the first coordinate is used to generate the signature share. Each participant 102 may also have access to a respective message independent component (MIC) of the signature share, i.e. the signature share may also be generated based on the respective MIC. The MIC itself may be generated, by a given participant 102, based on the respective private key share and the respective ephemeral private key of that participant 102, and also the first co-ordinate of the ephemeral public key.

Each participant 102 also has access to the same parent private key of a hierarchical key structure (e.g. a BIP32 HD wallet). That is, the parent private key is common to and known to each participant. This is contrasted with the shared private key where each participant 102 only has access to a respective share of the shared private key. Each participant 102 may have access to many private keys of the key structure, but it should be understood that reference to "the parent private key" is taken to mean the same particular one of those private keys. For example, the parent private key may be the master private key. Alternatively, the parent private key may belong to a different level of the key structure.

Each participant is associated with a respective index, referred to herein as a "participant index". For instance, the first participant 102a is associated with a first participant index, the second participant 102b is associated with a second participant index, and so on. Each participant index may be an integer, e.g. "1" for the first participant 102a, "2" for the second participant 102b, and so on. The specific values of the participant indexes are not important, rather it is only important that each participant has a unique participant index.

All of the above data items (e.g. private key share, ephemeral key share, etc.) may be generated during a set-up phase prior to a signature phase. For example, the data items may be generated prior to receiving a request from the coordinator 104 to provide a signature share.

The shared private key has a threshold, i.e. the private key can only be successfully generated based on at least the threshold number of different private key shares. Similarly, the signature has a threshold, meaning at least the threshold number of different signature shares are required to generate a valid signature. It should be appreciated that any reference to "the threshold" is taken to mean a number corresponding to the threshold of the private key. For example, the threshold may be two, or three, or ten, etc.

To generate a signature share, the first participant 102a first obtains at least the threshold number of respective participant indexes. One of the obtained respective participant indexes is a respective participant index of the first participant 102a. For example, if the threshold is five, the first participant 102a obtains five participant indexes, one of which is the participant index of the first participant 102a. The participant indexes may be obtained from the coordinator 104, e.g. the coordinator 104 may decide on the participant indexes and inform the participants. Alternatively, the participant indexes may be obtained from the participants 102 themselves, or they may have been predetermined in which case obtaining the participant indexes may comprise obtaining from memory of the first participant 102a.

Having obtained the threshold number (or more) of the participant indexes, the first participant 102a generates a private key index for generating a child private key based on the parent private key known to each participant. The private key index is generated based on a hash of the combination of the obtained participant indexes. For example, the participant indexes may be concatenated and then hashed. In general, any suitable hash function may be used, e.g. SHA256 or SHA512. Also, the participant indexes may be combined in other ways, e.g. summation, and not only via concatenation. In some examples, the hash digest, i.e. the result of hashing the combined participant indexes, may undergo additional processing in order to generate the private key index. For example, the modulo function may be applied to the hash digest so as to produce an index of a particular length. Additionally or alternatively, an integer number may be added to the hash digest (or modulo of the hash digest) to produce an index of a minimum size.

The child private key is then generated (i.e. derived) based on the parent public key. That is, if the parent public key belongs to level n of the key structure, the derived child private key will belong to level n+1 of the key structure. The coordinator 104 may inform the first participant of which of the private keys of the key structure are to be used as the parent private key. Alternatively, the parent private key to be used may be predetermined.

The child private key is a function of the parent private key and a first hash value. The first hash value is generated by inputting at least the parent private key and the private key index into a hash function, e.g. SHA256 or SHA512. In some embodiments, the hash function is a HMAC function. In these embodiments, a chain code of the parent private key may also be input to the HMAC function to generate the first hash value. Depending on the hash function that is used, e.g. if the HMAC function is used, the first hash value may comprise only part of the hash digest that is produced by inputting the data into the hash function. For example, the first hash value may be the leftmost x amount of bytes of the hash digest.

The first participant 102a then generates a respective signature share based on a message. The message may have been obtained (e.g. sent by the coordinator 104 to the first participant 102a) prior to generating the child private key, or after generating the child private key. The signature share is generated based on (i.e. is a function of) the first ephemeral key share (or more specifically, the inverse thereof), the first co-ordinate of the ephemeral public key (or more specifically, the first co-ordinate mod n, where n is the order of the elliptic curve), the child private key, the message (or more specifically, a hash of the message), and the first MIC share.

The other participants (e.g. the second participant 102b) who intend to generate a respective signature share perform an equivalent process of obtaining participant indexes, generating the private key index, generating the child private key and generating a respective signature share.

The first participant 102a may send the first signature share to the coordinator 104 for generating a signature based on at least the threshold number of signature shares. Alternatively, the first participant 102a may be the coordinator 104, in which case the first participant 102a may obtain respective signature shares from respective participants, and then generate a signature based on the respective signature shares.

In some examples, the first participant 102a may generate a public key corresponding to the child private key and a public key corresponding to the shared private key. From those two public keys, a public key (a "target public key") corresponding to the signing private key (i.e. the private key that, if it existed in the clear, could be used to generate the signature) may be generated. The first participant 102a or the coordinator 104 may make the target public key available to a verifying party to verify the signature.

In these or alternative examples, the first participant 102*a* may provide proof to the verifying party that the private key index used to generate the child private key is based on the first participant index associated with the first participant. This provides proof that the first participant 102*a* contributed a signature share for generating the signature.

Figure 3:
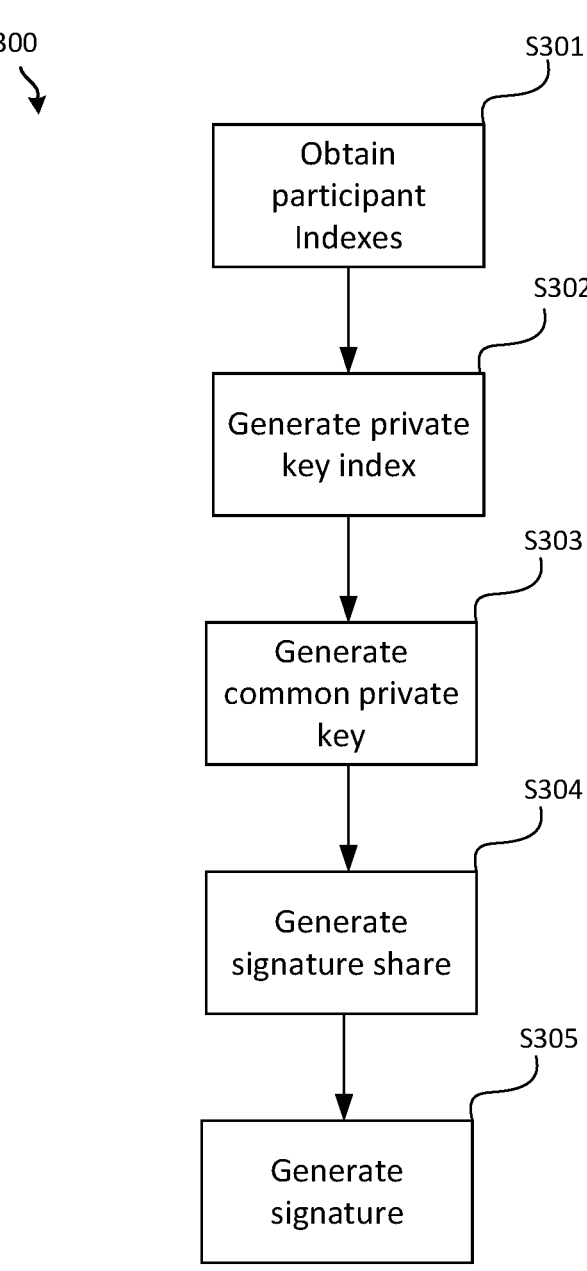
FIG. 3 is a flow diagram illustrating an example embodiment of the present invention.

FIG. 3 shows an example method 300 according to some embodiments of the present invention. At step S301 the first participant 102*a* obtains participant indexes. At step S302 the first participant 102*a* generates a private key index based on the obtained participant indexes. At step S303 the first participant 102*a* generates a common child private key based on a common parent private key and the private key index. At step S304 the first participant 102*a* generates a signature shared based on the common child private key. If the first participant is the coordinator, at step S305 the first participant generates a signature based on at least a threshold number of signature shares.

In some embodiments, each participant 102 may have a respective share of a single shared private key. That is, each participant 102 uses the same respective private key share when generating each respective signature share. In other embodiments, each participant 102 may generate a shared key structure, where instead the shared key structure comprising complete private keys, the shared key structure comprises private key shares. For instance, the first participant 102*a* has a first share of a shared master private key, the second participant 102*b* has a second share of the same shared master private key, the third participant 102*c* has a third share of the same shared master private key, and so on. The participants 102 also have respective shares of one or more shared auxiliary private keys, where each a shared auxiliary private key can be traced back (i.e. is a function of) the shared master private key. No individual participant 102 has access to any of the complete private keys of the shared key structure. When generating a respective signature share, each participant 102 uses, as the respective share of the shared private key needed to generate the respective signature share, either the respective share of the shared master private key or a respective share of one of the shared auxiliary private keys.

The following describes an example method for generating a shared key structure. The first participant 102*a* obtains, e.g. generates or receives, a first seed share. As set out above, "first" is used here merely as a label. A "seed share" may be an integer or string, that is preferably only known to the first party 102*a*. The seed share may be randomly or pseudo-randomly generated. It is also not excluded that the seed share is previously known to the first participant 102*a*. Whilst referred to a share, preferably the participants respective seed shares are not shares (i.e. components) of a common seed, although that it is not excluded. The second participant 102*b* and third participant 102*c* also obtain a respective seed share, e.g. the second participant 102*b* generates a second seed share.

The first participant 102*a* generates a first master private key share, i.e. a share of a shared master private key. The first master private key share is generated based on, i.e. is a function of, the first seed share (i.e. the first participant's share) and the respective seed share of each other participant. E.g. following on from the above example, the first master private key share is generated based on each of the first, second and third seed shares. Similarly, the second participant 102*b* and third participant 102*c* generate a second master private key share and a third master private key share respectively.

Having generated the first master private key share, the first participant 102*a* generates one or more first private key shares, wherein each first private key share is a share of a different shared private key. Again, "first" is used as a label to refer to private key shares that are generated based on, i.e. a function of, the master private key share. There may be many different "first private key shares". Each other participant, e.g. the second participant 102*b* and third participant 102*c*, may also generate respective shares of the shared private keys. The private key shares (e.g. the first master private key share and each of the first private key shares) may be generated at once together, or they may be generated as and when required. Similarly, each of the generated private key shares may be stored together or separately. One or more of the generated private key shares may be deleted after use.

In some embodiments, the first participant 102*a* may generate a first data item based on, i.e. as a function of, the first seed share. Generating the first data item may comprise applying a hash function to at least the first seed share to generate a first component of the first data item, i.e. the first component is some or all of the hash of at least the first seed share. Any hash function may be used, e.g. SHA256, SHA512, etc. In some examples a hash function that performs more than one hashing operation could be used, such as a double-hash, e.g. SHA256 followed by SHA256. The other participants similarly generate a respective data item, e.g. the second participant 102*b* generates a second data item and the third participant 102*c* generates a third data item. The first participant 102*a* obtains, e.g. receives, the other data items and generates the first master private key share based on, i.e. as a function of, the first data item and the other data items. The other participants generate their respective master private key shares in a similar way.

Preferably the hash function is a hash-based message authentication code (HMAC) function. In these examples, since a HMAC function requires two inputs, the first participant 102*a* inputs both the first seed share and another input into the HMAC. The other input may be a different seed share, the same seed share, or data known to each participant, e.g. a known integer or string. In these examples, the first component may be the entire output of the HMAC function, or a part of the output, e.g. the left 256 bytes.

The respective master private key shares may be generated using a secret sharing scheme. That is, each participant 102 participates in a secret sharing scheme to generate a respective share of a shared secret. For instance, the secret sharing scheme may be a joint verifiable secret sharing scheme (JVRSS) or a Shamir's secret sharing scheme (SSSS), or a different scheme. For instance, and as described above, in JVRSS each participant generates t+1 random numbers $a_{ij}$, and then uses those numbers as coefficients of a polynomial of order t. Now, for the present invention, the first participant may set the value $a_{i0}$ to be the "first component", e.g. some or part of the hash of the first seed. The "first data item" is then $f_i(x)=a_{i0}+a_{i1}x+ \ldots +a_{it}x^t \bmod n$, and the first master private key share is $$a_i := \sum_{j=1}^{N} f_j(i),$$

where N is the number of participants. Whilst JVRSS is an example of a dealer-less scheme which may be used to share secrets, a scheme with a dealer (e.g. a trusted third party) may also be utilized to generate the master private key shares.

The concept of HD key structures (or HD wallets) is introduced above. The first participant $102a$ may generate a HD key structure of private key shares, where each private key share is ultimately derivable from the first master key share. The HD key structure may comprise multiple levels of parent private key shares and/or child private key shares. Some private key shares may be both a parent to a respective child private key share, and a child of a respective parent private key share.

Before describing how the HD key structure may be generated, an example method for generating the master private key shares $a_{i\text{-}master}$ is provided. This particular example derives the master key $a_{master}$ using JVRSS, defining the master private key as $$a_{master} = \sum_{i=1}^{N} HMAC\text{-}SHA512_L(\text{'Bitcoin seed of participant } i\text{'}, seed_i)$$

where $seed_i$ is the seed of participant i may come from a branch of a participant's personal BIP32 wallet. No single participant knows this result, instead the participants have shares of this $a_{i\text{-}master}$ calculated using JVRSS. This is achieved by defining the $a_{i0}$ in step 1 of JVRSS as:

$$a_{i0} = HMAC\text{-}SHA512_L(\text{'Bitcoin seed of participant i'}, seed_i),$$

instead of random values as in the usual JVRSS. The right half of the result of the HMAC will be the corresponding chain code of participants i seed.

$$c_{i\text{-}master} = HMAC\text{-}SHA512_R(\text{'Bitcoin seed of participant i'}, seed_i),$$

At this point, the participants 102 have secret shares of the private master key $a_{i\text{-}master}$, and individual chain codes $c_{i\text{-}master}$ corresponding to the seed i. Because participants 102 have shares $a_{i\text{-}master}$ with some threshold, if any of the shares are lost, the key is still recoverable. In the unlikely event that all the shares are lost, the keys can be rederived using the seed from each participant i.

Options for generating the first private key shares based on the first master private key share will now be described. One option involves the use of a set of auxiliary private keys, e.g. an auxiliary HD key structure or auxiliary wallet. The first participant $102a$ may use an existing set of auxiliary private keys or generate a new set. Then, each first private key share is generated by based on, i.e. is a function of, the first master private key share and a respective one of the set of auxiliary private keys. For example, the first participant $102a$ may use a HD key structure comprising auxiliary private keys at different levels and/or positions of the structure to generate a shared HD key structure (or shared wallet), wherein the shared HD key structure comprises shares of private keys at corresponding levels and/or positions. E.g. a share of a parent private key in the shared HD key structure may be generated based on an auxiliary parent private key at a corresponding position in the auxiliary key structure. Similarly, a share of a child private key in the shared HD key structure may be generated based on an auxiliary child private key at a corresponding position in the auxiliary key structure.

Each other participant 102 may similarly generate respective shares of the same shared private keys using the same auxiliary private keys and their respective master private key share. In order to do so, each participant requires the same auxiliary private keys(s). In some examples, each participant 102 uses a common master auxiliary private key that is known to each participant, and derives any other required auxiliary private key from the master auxiliary private key.

In some examples, each participant uses a common seed to derive the auxiliary master private key. The common seed may be generated by one participant, e.g. the first participant $102a$, and shared with the other participants 102. Alternatively, the common seed may be collectively generated using a secret sharing scheme, e.g. JVRSS or SSSS. The common seed may be generated based on a first shared secret (e.g. the shared master private key) and a second shared secret (e.g. a blinding or obfuscation key). That is, each participant has a respective share of a first shared secret and a respective share of a second shared secret. Each participant combines their two respective shares to generate a respective "combined share". The participants may share their respective combined shares with each other participant 102, i.e. the first participant $102a$ obtains a respective combined share from each other participant 102. The combined shares may then be combined, e.g. interpolated over, to generate the common seed from which the auxiliary master private key is generated. If the shared secrets are threshold secrets, rather than needing a respective common share from each other participant, the first participants $102a$ only needs a threshold number of common shares in order to generate the common seed.

The auxiliary master private key may be generated by applying a hash function to at least the common seed. The hash function may be a HMAC function, in which case both the common seed and an additional seed are input to the HMAC function. The auxiliary master private key may be a part of the HMAC output, e.g. the left 256 bytes.

These embodiments may be used to generate a shared HD wallet, e.g. a shared BIP32 wallet. For instance, a separate BIP32 wallet may be used to derive keys $sk_{parent}$, $sk_{child}$ etc., that are added to the key shares $a_{i\text{-}master}$. The master private key $sk_{master}$ is derived from a seed as usual and is known to every participant. The master private key is not used in the calculation of new key shares, but the first child keys derived from the master key $sk_{master}$ may be used, labelled below as $sk_{parent}$. A private child key share is defined as $$a_{i\text{-}child} = a_{i\text{-}master} + sk_{parent},$$

and grandchild keys will be $$a_{i\text{-}grandchild} = a_{i\text{-}master} + sk_{child},$$

where $sk_{child}$ is derived from $sk_{parent}$ as a usual BIP32 child key, and so on. This implies that the full child private key (which preferably never exists) would be $$a_{child} = a + sk_{parent}$$

and an equivalent equation for the grandchild key. These keys will be defined as hardened or non-hardened depending on whether the auxiliary wallet key is hardened or non-hardened.

One option with this wallet is to have the value $sk_{master}$ to be the blinded private key $a+\rho$, and derive all further child keys from this, relating it to the shared private key a without any single party knowing a explicitly. Explicitly, the steps for this are 1. Participants execute two rounds of JVRSS, one corresponding to the shared private key a and the other corresponding to a blinding secret $\rho$. Each participant i has a corresponding private key share $a_i$ and blinding secret share $\rho_i$.
2. Each participant i calculates the addition of their secret shares $a_i+\rho_i$ and broadcasts this to the other participants.
3. Each participant interpolates over at least $t+1$ addition shares to find $a+\rho$.
4. This result is used as the seed in $sk_{master}$ such that $$sk_{master} = HMAC\text{-}SHA512_L(\text{'Bitcoin Seed'}, a+\rho)$$

and the chain code is $$c_{master} = HMAC\text{-}SHA512_R(\text{'Bitcoin Seed'}, a+\rho),$$

which are used to derive $sk_{parent}$ keys and used in the equation as described above. The method of adding a secondary key that is a normal BIP32 wallet key requires no additional rounds of communication as the necessary information can be shared alongside the set-up of the shared secret.

Another option for generating the first private key shares based on the first master private key share involves the use of hash (e.g. HMAC) functions. This option is particularly suited for generating a shared HD key structure. As shown in FIG. 2, each private key in HD key structure has a parent private key. The parent of the private keys in a first level in the HD key structure may be the master private key, where the master private key is at the zeroth level.

A shared HD key structure may be generated, where each private key share (i.e. a child key share) is generated based on a respective parent private key share and an index assigned to the child private key share. The index designates the position of the key in the tree. Each child private key share may also be generated based on a respective chain code of the respective parent private key share. More specifically, each child private key share may be generated based on a first term and a second term. The first term is generated based on, i.e. is a function of, the parent private key share. In some examples, the first term may be the parent private key share. The second term is generated by inputting at least the parent private key share or a corresponding public key into a hash function. Also input to the hash function is an index of the child private key share that is being generated. In some examples, the parent private key share and the index may be concatenated.

A child private key that is generated by inputting the parent private key to the hash function is sometimes referred to as a "hardened child private key". Similarly, a child private key share that is generated by inputting the parent private key share to the hash function is referred to below as a "hardened child private key share". In contrast, a child private key that is generated by inputting a public key corresponding to the parent private key into the hash function is sometimes referred to as a "non-hardened child private key". Similarly, a child private key share that is generated by inputting a public key corresponding to the parent private key share into the hash function is referred to below as a "non-hardened child private key share".

The hash function may be a HMAC function. A child private key share may be generated based on a first part of the HMAC output, e.g. the left 256 bytes if the HMAC uses the SHA256 hash function.

A chain code share of the parent private key share may also be input to the hash function, e.g. if the hash function requires two separate inputs. The purpose of the chain code is to add more entropy into the derivation of child keys. For a given private key share, the chain code share for that private key share may be a second part of the HMAC output. E.g. the chain code share may be the right 256 bytes. The chain code share of a given private key share (call it a "target key share") is based on the parent private key share, the index of the target key share and the chain code share of the parent private key share.

The examples above derive child private keys using parent private key shares or public keys corresponding to the parent private key shares. Child private key shares may also be generating using a master public key, or more generally a parent public key. That is, using a public key corresponding to the full master private key or full parent private key, rather than the public key corresponding to a private key share. In these instances, a chain code for the full private key does not exist since the full private key itself does not exist, i.e. no participant knows the full private key. Each participant 102 may therefore use a common chain code for each child private key share that is derived in this way. That is, the participants 102 may agree upon a common chain code to use. The common chain code may be generated based on, e.g. may comprise a sum of, the respective parent chain code shares of the respective parent private key shares corresponding to the full parent private key. As an example, the first participant 102 may obtain a master chain code share corresponding from each participant and use them, along with the first master chain code share of the first master private key share, to generate a common chain code. Then, when generating the first child private key share, the second term is generated by inputting into the hash function (e.g. HMAC function) the common chain code, a public key corresponding to the parent private key and a respective index of the first child private key share. The public key and index may be concatenated. Since these child key shares are derived using a public key they are referred to as "non-hardened key shares".

The following provides further details on how to generate child private key shares and corresponding public keys.

Hardened child keys may be derived using a sum of individual BIP32 terms $$a_{child} = a_{parent} + \sum_{j=1}^{N} HMAC\text{-}SHA512_L(c_{j-parent}, a_{j-parent}\|\text{index}).$$

Then grandchild keys would be $$a_{grandchild} = a_{child} + \sum_{j=1}^{N} HMAC\text{-}SHA512_L(c_{j-child}, a_{j-child}\|\text{index}),$$

and so on. Note that the full private keys themselves are not actually generated.

The second term in these equations is calculated using JVRSS where the constant term of participant i's secret polynomial is $\text{HMAC-SHA512}_L$ ($c_{i\text{-}parent}$, $a_{i\text{-}parent}\|\text{index}$). Then after calculating the share corresponding to this JVRSS labelled $a_{i\text{-}HMAC_L(parent)}$, they can simply add the share to their old share $a_{i\text{-}parent}$ that the new share is $$a_{i-child} = a_{i-parent} + a_{i-HMAC_L(parent)}.$$

There is an equivalent relation for grandchild keys, and so on. Interpolating over this result would result in the child key above. By deriving the child keys in this way, even if a key is compromised, the child keys cannot be calculated, which is even more secure than a usual BIP32 wallet.

The following describes two methods for generating non-hardened child key shares. The first method is similar to the method described above for generating hardened keys. There is a drawback that the individual public keys corresponding to key shares must be shared, but this can be done at the same time as the corresponding chain code(s), and so there is no additional communication in any case. The second method resolves this issue of needing to share more information, and can be calculated by any external party with knowledge of the public key and chain code as in the usual BIP32 wallet.

In the first method, each participant in a shared secret scheme derives their child private key share using the equation $$a_{i-child} = a_{i-parent} + \sum_{j=1}^{N} HMAC\text{-}SHA512_L(c_{j-parent}, (a_{j-parent} \cdot G)\|\text{index}).$$

The pair ($a_{i\text{-}child}$, $a_{child}\cdot G$) can be used in the same way as the shares ($a_i$, $a\cdot G$) in a shared secret scheme. For external parties wanting to derive the corresponding public key $$a_{child} \cdot G =$$

$$a_{parent} \cdot G + \sum_{j=1}^{N} HMAC\text{-}SHA512_L(c_{j-parent}, (a_{j-parent} \cdot G)\|\text{index}) \cdot G,$$

the additional information $c_{j\text{-}parent}$ and ($a_{j\text{-}parent}\cdot G$) must be shared initially. After the first iteration, they can calculate this information themselves.

In the second method, when considering the derivation of the first child key there is no single chain code $c_{parent}$ due to the derivation of the master key. In this case $c_{parent}$ is defined to be $$c_{parent} = \sum_{i=1}^{N} c_{i-parent}.$$

The participants add their individual chain codes to get the first parent chain code. After the first non-hardened child keys are derived, the chain code reverts to the normal definition.

Each participant in the scheme then derives their child private key share using the equation $$a_{i-child} = a_{i-parent} + HMAC\text{-}SHA512_L(c_{parent}, a_{parent} \cdot G\|\text{index})$$

and the child public key can be calculated by external parties using $$a_{child} \cdot G = a_{parent} \cdot G + HMAC\text{-}SHA512_L(c_{parent}, a_{parent} \cdot G\|\text{index}) \cdot G$$

As discussed above, the private key shares (e.g. parent private key shares of child private key shares) that are generated based on the master private key share may be used as part of the signature scheme described above to sign the message. For instance, the respective private key share that is used by each participant 102 to generate a respective signature share may occupy a position in the shared key structure corresponding to the position of the common parent private key of the common child private key (i.e. the child private key derived based on the participant indexes) that is used by each participant 102 to generate the signature share.

The following provides a specific example of generating a signature share according to the described embodiments. As mentioned above, in a threshold signature scheme, there is no way to identify who has created a given signature due to the signature derivation—the resulting signature will always be the same no matter which shares were used to create it. To prove a subset of the group, the aim is to have some record of the indices (or indexes) or the identities of signers that create a signature in a derived key. We assume that the threshold signature scheme is implementing a shared secondary key structure (e.g. wallet) as described above. In order to create a signature where the shared private key identifies who created the signature, the index of the derived HD key $sk_{child}$ is generated such that it depends on the indices of the signers in the scheme. Assume that the signers conveniently have indices 1, . . . , t+1 without loss of generality. The index of the derived key $sk_{child}$ is calculated using $$\text{index} = \text{hash}(1\| \ldots \|t + 1)\text{mod}2^{31}$$

for a hardened key or $$\text{index} = \left(\text{hash}(1\| \ldots \|t + 1)\text{mod}2^{31}\right) + 2^{31}$$

for a non-hardened key. That is, the signing key to be used will be $$a_{child} = a_{parent} + sk_{child}$$

where the index used to derive $sk_{child}$ is as above. Recall that the formula for $sk_{child}$ may take the following form:

$$sk_{child} = sk_{parent} + HMAC\text{-}SHA512_L(c_{parent}, sk_{parent}\|\text{index})$$

During signature creation, participants receive a request to create a signature and those with willingness to sign respond with a broadcasted message to that affect. The coordinator then selects the first t+1 to respond and communicates the signers' indices with each other (and an identifier of $a_{parent}$ if that is changing with each key, as described in the previous section). Each signer i calculates their signature share $$s_i = k_i^{-1}(e + sk_{child}r) + r\sigma_i$$

where $$k_i^{-1},$$

$\sigma_i$, and r have been precalculated during pre-signature generation. Here, $\sigma_i$ is the ephemeral private key share, $\sigma_i$ is the MIC share, r is derived from the x-coordinate of the ephemeral public key, and e is the hash of the message. This is then returned to the coordinator to create a valid signature. They (or the coordinator) also calculate the public key corresponding to the signing key using the equation $$a_{child}G = a_{parent}G + sk_{child}G$$

which may be used by any verifier of the signature.

Finally, in order to prove those who created this signature, a signer proves that $sk_{child}$ is derived from an index that is derived from their index in the threshold signature scheme, that $a_{child}G=a_{parent}G+sk_{child}G$, and finally that the signature created corresponds to this public key.

Even though this contains information about who creates the signature, the key may be derived by any participant in the scheme if required. The $a_{parent}$ term contributes the threshold requirement of the derived key and the $sk_{child}$ may be thought of as a constant that is added to the parent key shares. By using the HD key derivation, this allows for recoverability of $sk_{child}$ from only the seed. To improve recoverability, the index may be included in the message that is being signed.

The signer may provide that $sk_{child}$ is derived from an index that is derived from their respective participant index in one of several ways. For instance, if the private key $sk_{child}$ is a non-hardened key (i.e. derived from the parent public key) then it is safe to reveal the complete derivation of the index. If the private key $sk_{child}$ is a hardened key (i.e. derived from the parent private key) then the signer may provide a zero-knowledge proof of the index, or an equivalent proof. As another example, the proof may be provided by a trusted third party. For instance, since the serialised extended public key contains the index, if the public key is provided by a trusted third party then one can trust the index.

FIG. 4 illustrates an example method 400 for generating a signature on a message according to embodiments of the invention. Steps S401 to S409 are performed by each of a threshold number of participants 102 in this example (including the first participant 102a). Step S410 is performed by a coordinator 104, who may also may one of the participants performing steps S401 to S409. It will be appreciated that some of the steps may be omitted or be performed in a different order.

The example method 400 enables the creation of a shared secret of threshold (t+1) in a group of N≥2t+1 participants, where the signing threshold is also (t+1).

Set-Up:

In step S401, each participant 102 calculates a child private key share $a_{i-child}$ and a corresponding public key. The generation of the child private key share $a_{i-child}$ has been described above. At this point, each participant i has a secret child key share and public key ($a_{i-child}$, P), where P is notation for the public key corresponding to the shared private key, i.e. $a_{child}$·G. The shared private key has a threshold of (t+1).

Pre-Calculation:

In step S402, each participant 102 calculates a shared ephemeral key share and a corresponding public key. For instance, each participant 102 may calculate a shared ephemeral key using JVRSS and the calculation of the public key given in the preliminaries. Each participant 102 may then calculate an inverse share based on the ephemeral private key. This results in each participant having an inverse share $$(k_i^{-1}, r),$$

with a threshold of (t+1).

In step S403, each participant 102 creates two different shared blinding key shares. For instance, each participant 102 may create two shared secrets so that participant i has shares $\alpha_i$=JVRSS(i) and $\beta_i$=JVRSS(i), each shared secret having a threshold (t+1). Note that in some examples, not all of the shared secrets need to have the same threshold.

In step S404, each participant 102 calculates an intermediary share and broadcasts their intermediary share to the other participants. For instance, each participant i may calculate the intermediary share $$\lambda_i = k_i^{-1}a_{i-child} + \beta_i.$$

This value has a threshold of (2t+1).

In step S405, each participant 102 calculates an intermediary value based on at least the intermediary shares. For instance, each participant 102 may calculate the intermediary value using interpolation over (2t+1) shares $\lambda$=interpolate($\lambda_1$, . . . , $\lambda_{2t+1}$)=$k^{-1}a+\beta$.

In step S406, each participant 102 calculates a pre-signature share (i.e. a message-independent component of a signature share). For instance, each participant i may calculate their pre-signature share $\sigma_i=\lambda-\beta_i=(k^{-1}a+\beta)-\beta_i$. Each participant 102 may store $$(r, k_i^{-1}\sigma_i),$$

and the private key share and corresponding public key ($a_{i-child}$, P).

Note that since a different ephemeral key is used for each signature, multiple ephemeral keys can be set up at one time, that is, steps S402 to S406 can be repeated to create multiple ephemeral keys during pre-calculation and stored for later use. These can be executed at the same time so that there are no additional rounds of communication. Note that preferably, a different value of $\alpha$ and $\beta$ should be used for each signature.

Signature Generation:

In order to sign a message msg, at least (t+1) participants must perform steps S407 and S408.

In step S407, at least the threshold number of participants 102 obtain a message to be signed and calculate a message digest. For instance, a coordinator 104 may send a request to (t+1) participants to create a signature share on the message msg. Each participant i may calculate the message digest e=hash(msg). In some examples, this hash function is the double SHA-256 hash function. Alternative hash functions may be used.

At step S408, at least the threshold number of participants 102 generate a common child private key, as described above.

In step S409, at least the threshold number of participants 102 calculate a signature share and send it to the coordinator 104. For instance, each participant i may calculate their signature share $$s_i = k_i^{-1}(e + sk_{child}r) + r\sigma_i,$$

and then send their signature share (r, $s_i$) to the coordinator. Note that the value r may not be sent by all participants.

In step S410, the coordinator 104 calculates the signature. For instance, the coordinator 104 may calculate s=interpolate($s_1$, . . . , $s_{t+1}$), and finally the signature (r, s).

In general, embodiments of the present invention can be used to generate a signature on any message. As a particular example use case, as shown in FIG. 1, the message may be part or all of a blockchain transaction. That is, the signature may be used to sign one or more inputs and/or one or more outputs of a blockchain transaction. For instance, the generated signature may be used, at least in part, to unlock an output of a blockchain transaction. As a particular example, the output of a previous transaction may be a pay-to-public-key-hash (P2PKH) output which is locked to a hash of a public key. In order to be unlocked, an input of a later transaction that references the P2PKH output needs to include the (unhashed) public key and a signature generated based on the private key corresponding to the public key. The coordinator 104 may sign the blockchain transaction and submit the signed transaction to one or more blockchain nodes of a blockchain network 106.

Represented in script, the "locking script" and "unlocking script" may take the following forms:

Locking script =

OP_DUP OP_HASH160 ⟨Public *KeyHash*⟩ OP_EQUAL OP_CHECKSIG

Unlocking script = ⟨Signature⟩⟨Public Key⟩

Referring to the above described embodiments, the <Public Key> may be equated to P=$a_{child}$·G, and the <Signature> comprises the threshold signature s, where the previous transaction is the message to be signed. Note that as stated above, ECDSA signatures are in the form (r, s).

Note that the described signature generation method is not limited to any particular use case and may in general be used for generating a signature based on any message. Signing all or part of a blockchain transaction is just one illustrative example. The described method may be used to sign and/or authorise, for instance, a legal document (e.g. a will, deed or other contract), correspondence between one or more parties, digital certificates (e.g. issued by a certificate authority), medical prescriptions, a bank transfer or a financial instrument, a mortgage or loan applications, etc.

As a particular example, the group of participants (say five participants in total) may form the board of a company. Voting matters of the company may require a majority of the board (i.e. at least three participants) to agree on the particular vote. The board may use the described signature generation method to prove that at least three board members agreed to vote in favour of a particular outcome. In this example, the threshold of the signature generation scheme is three. That is, at least three of the board members must provide a respective signature share in order for the coordinator to successfully generate a signature. If a signature is generated successfully, at least the threshold number (i.e. three) of board members must have agreed to vote in favour of that outcome. Thus the successful generation of a signature acts as a record of the vote and proves that a majority of the board voted in a particular way.

Another use case for the present invention lays in the field of digital certificates, e.g. digital certificate issued by the X.509 standard. A digital certificate contains a signature that signs over some data. The data can in general be any data, but one particular example of data included in a digital certificate is a public key. A public key in a digital certificate is often referred to as a "certified public key". The issuer of the digital certificate (a "certificate authority") may perform one or more checks on the owner of the public key (e.g. know-your-customer checks), and if the checks are successful, the certificate authority issues a digital certificate that includes the certified public key. A user can use a certified public key to prove they are who they say they are, e.g. by signing a message with a private key corresponding to the certified public key. One particular use for certificate authorities is to sign certificates used in HTTPS for secure browsing on the internet. Another common use is in issuing identity cards by national governments for use in electronically signing documents. The certificate authority signs the public key (or any other data to be attested to) using a private key.

As stated above, embodiments of the present invention may involve encrypting a message with a public key corresponding to a private key share, and similarly decrypting the message with a private key share. In that case, the first participant 102a may decrypt the message that has been encrypted by a different party. As another option, a message may be encrypted with a public key corresponding to a full private key, e.g. a full child key. In that case, at least a threshold number of participants may make their respective shares of the child private key available in order to decrypt the message. The message that is encrypted may comprise some or all of a blockchain transaction, e.g. encrypted data may be included in a transaction to be recorded on the blockchain.

CONCLUSION

Other variants or use cases of the disclosed techniques may become apparent to the person skilled in the art once given the disclosure herein. The scope of the disclosure is not limited by the described embodiments but only by the accompanying claims.

It will be appreciated that the above embodiments have been described by way of example only. More generally there may be provided a method, apparatus or program in accordance with any one or more of the following Statements.

Statement 1. A computer-implemented method of generating a respective signature share of a digital signature for signing a message, wherein each participant of a group of participants has i) a respective private key share of a shared private key, wherein the shared private key can only be generated with at least a threshold number of respective private key shares, ii) a respective ephemeral private key share of a shared ephemeral private key, iii) a first co-ordinate of an ephemeral public key corresponding to the shared ephemeral private key, and iv) a first common private key of a first hierarchical key structure, wherein each participant is associated with a respective participant index, and wherein the method is performed by a first participant of the group and comprises:

obtaining at least the threshold number of respective participant indexes, wherein the obtained respective participant indexes comprises a first participant index associated with the first participant;

generating a private key index, wherein the private key index is generated based on a hash of a combination of the obtained respective participant indexes;

generating a second common private key of the first hierarchical key structure, wherein the second common private key is generated based on the first common private key and a first hash value, wherein the first hash value is generated by inputting at least a) the first common private key or a corresponding public key, and b) the private key index into a hash function; and generating a first signature share of the digital signature, wherein the first signature shared is generated based on a first ephemeral key share, the message, the second common private key, the first co-ordinate of the ephemeral public key, and a first private key share.

Statement 2. The method of statement 1, wherein each participant has v) a respective share of a message-independent component, MIC, of the respective signature share, wherein each respective share of the MIC is generated based on the respective ephemeral private key share, the respective private key share and the first co-ordinate of the ephemeral public key, and wherein the first signature share is based on a first share of the MIC.

Statement 3. The method of statement 1 or statement 2, wherein the first participant is a coordinating party, and wherein the method comprises:

obtaining, from respective participants, at least the threshold number of respective signature shares of the digital signature, wherein said obtaining of the respective signature shares comprises said generating of the first signature share of the digital signature; and generating the digital signature based on at least the obtained threshold number of respective signature shares.

Statement 4. The method of statement 1 or statement 2, comprising:

making the first signature share of the digital signature available to a coordinating party for generating the digital signature based on at least the threshold number of respective signature shares of the digital signature generated by respective participants.

Statement 5. The method of statement 4, wherein said obtaining of at least the threshold number of respective participant indexes comprises obtaining some of all of the respective participant indexes from the coordinating party.

Statement 6. The method of any preceding statement, wherein said obtaining of at least the threshold number of respective participant indexes comprises obtaining at least some of the respective participant indexes from the respective participants.

Statement 7. The method of any preceding statement, wherein the hash function is a HMAC function.

Statement 8. The method of statement 7, wherein the first common private key is associated with a first chain code, and wherein the first hash value is generated by inputting at least the first chain code, the first common private key, the private key index into the HMAC function Statement 9. The method of statement 7 or statement 8, wherein the first hash value is a first part of a result of inputting at least the first common private key and the private key index into the HMAC function.

Statement 10. The method of any preceding statement, wherein the first common private key is a master private key of the first hierarchal key structure.

Statement 11. The method of any of statements 1 to 9, wherein the first common private key is a private key of the first hierarchical key structure other than the master private key.

Statement 12. The method of any preceding statement, comprising:

obtaining an indication of which private key of the first hierarchical key structure is to be used as the first common private key.

The indication may be obtained from the coordinating party.

Statement 13. The method of any preceding statement, wherein the first private key share of the shared private key is generated by:

obtaining a first seed share, wherein each other participant has a respective seed share;

generating a first master private key share of a shared master private key, wherein the first master private key share is generated based on the first seed share and the respective seed share of each other participant, and wherein each other participant has a respective master private key share, and wherein the first private key share is the first master private key share or one of one or more auxiliary private key shares generated based on the first master private key share.

Statement 14. The method of statement 13, wherein the first master private key share and each of the one or more auxiliary private key shares are arranged in a second hierarchical key structure, wherein the one or more auxiliary private key shares are respective parent private key shares, and/or respective child private key shares, wherein each parent private key share of a given level in the second hierarchical key structure is a parent to one or more child private key shares in a subsequent level in the second hierarchical key structure, and wherein the first private key share occupies a same position in the second hierarchical key structure as the second common private key in the first hierarchical key structure.

Statement 15. The method of any preceding statement, wherein each participant has a public key corresponding to the shared private key, and wherein the method comprises:

generating a second public key corresponding to the second common private key; and generating a target public key for verifying the digital signature, wherein the target public key is generated based on the public key corresponding to the shared private key and the second public key corresponding to the second common private key.

Statement 16. The method of statement 15, comprising:
sending, to a verifying party, the target public key for verifying the digital signature.

Statement 17. The method of any preceding statement, comprising:
sending, to the verifying party, proof that the private key index used to generate the second common private key was generated based on the first participant index associated with the first participant, thereby proving that the first participant generated a signature share of the digital signature.

Statement 18. The method of any preceding statement, wherein the message comprises at least part of a blockchain transaction.

Statement 19. Computer equipment comprising:
memory comprising one or more memory units; and
processing apparatus comprising one or more processing units, wherein the memory stores code arranged to run on the processing apparatus, the code being configured so as when on the processing apparatus to perform the method of any of statements 1 to 18.

Statement 20. A computer program embodied on computer-readable storage and configured so as, when run on one or more processors, to perform the method of any of statements 1 to 18.

According to another aspect disclosed herein, there may be provided a method comprising the actions of each participant.

According to another aspect disclosed herein, there may be provided a system comprising the computer equipment of each participant.

The invention claimed is:

1. A computer-implemented method of generating a respective signature share of a digital signature for signing a message, wherein each participant of a group of participants has i) a respective private key share of a shared private key, wherein the shared private key can only be generated with at least a threshold number of respective private key shares, ii) a respective ephemeral private key share of a shared ephemeral private key, iii) a first co-ordinate of an ephemeral public key corresponding to the shared ephemeral private key, and iv) a first common private key of a first hierarchical key structure, wherein each participant is associated with a respective participant index, and wherein the method is performed by a first participant of the group and comprises:
obtaining at least a threshold number of respective participant indexes, wherein the obtained respective participant indexes comprises a first participant index associated with the first participant;
generating a private key index, wherein the private key index is generated based on a hash of a combination of the obtained respective participant indexes;
generating a second common private key of the first hierarchical key structure, wherein the second common private key is generated based on the first common private key and a first hash value, wherein the first hash value is generated by inputting at least a) the first common private key or a corresponding public key, and b) the private key index into a hash function; and
generating a first signature share of the digital signature, wherein the first signature shared is generated based on a first ephemeral key share of the shared ephemeral private key, the message, the second common private key, the first co-ordinate of the ephemeral public key, and a first private key share of the shared private key.

2. The method of claim 1, wherein each participant has v) a respective share of a message-independent component, MIC, of the respective signature share, wherein each respective share of the MIC is generated based on the respective ephemeral private key share, the respective private key share and the first co-ordinate of the ephemeral public key, and wherein the first signature share is based on a first share of the MIC.

3. The method of claim 1, wherein the first participant is a coordinating party, and wherein the method comprises:
obtaining, from respective participants, at least the threshold number of respective signature shares of the digital signature, wherein said obtaining of the respective signature shares comprises said generating of the first signature share of the digital signature; and
generating the digital signature based on at least the obtained threshold number of respective signature shares.

4. The method of claim 1, comprising:
making the first signature share of the digital signature available to a coordinating party for generating the digital signature based on at least the threshold number of respective signature shares of the digital signature generated by respective participants.

5. The method of claim 4, wherein said obtaining of at least the threshold number of respective participant indexes comprises obtaining some of all of the respective participant indexes from the coordinating party.

6. The method of claim 1, wherein said obtaining of at least the threshold number of respective participant indexes comprises obtaining at least some of the respective participant indexes from the respective participants.

7. The method of claim 1, wherein the hash function is a HMAC function.

8. The method of claim 7, wherein the first common private key is associated with a first chain code, and wherein the first hash value is generated by inputting at least the first chain code, the first common private key, the private key index into the HMAC function.

9. The method of claim 7, wherein the first hash value is a first part of a result of inputting at least the first common private key and the private key index into the HMAC function.

10. The method of claim 1, wherein the first common private key is a master private key of the first hierarchal key structure.

11. The method of claim 1, wherein the first common private key is a private key of the first hierarchical key structure other than a master private key.

12. The method of claim 1, comprising:
obtaining an indication of which private key of the first hierarchical key structure is to be used as the first common private key.

13. The method of claim 1, wherein the first private key share of the shared private key is generated by:
obtaining a first seed share, wherein each other participant has a respective seed share;
generating a first master private key share of a shared master private key, wherein the first master private key share is generated based on the first seed share and the respective seed share of each other participant, and wherein each other participant has a respective master private key share, and wherein the first private key share is the first master private key share or one of one or more auxiliary private key shares generated based on the first master private key share.

14. The method of claim 13, wherein the first master private key share and each of the one or more auxiliary private key shares are arranged in a second hierarchical key structure, wherein the one or more auxiliary private key shares are respective parent private key shares, and/or respective child private key shares, wherein each parent private key share of a given level in the second hierarchical key structure is a parent to one or more child private key shares in a subsequent level in the second hierarchical key structure, and wherein the first private key share occupies a same position in the second hierarchical key structure as the second common private key in the first hierarchical key structure.

15. The method of claim 1, wherein each participant has a public key corresponding to the shared private key, and wherein the method comprises:

generating a second public key corresponding to the second common private key; and generating a target public key for verifying the digital signature, wherein the target public key is generated based on the public key corresponding to the shared private key and the second public key corresponding to the second common private key.

16. The method of claim 15, comprising:

sending, to a verifying party, the target public key for verifying the digital signature.

17. The method of claim 1, comprising:

sending, to a verifying party, proof that the private key index used to generate the second common private key was generated based on the first participant index associated with the first participant, thereby proving that the first participant generated a signature share of the digital signature.

18. The method of claim 1, wherein the message comprises at least part of a blockchain transaction.

19. Computer equipment comprising:

memory comprising one or more memory units; and processing apparatus comprising one or more processing units, wherein the memory stores code arranged to run on the processing apparatus, the code being configured so as when run on the processing apparatus the processing apparatus is configured to perform a method of generating a respective signature share of a digital signature for signing a message, wherein each participant of a group of participants has i) a respective private key share of a shared private key, wherein the shared private key can only be generated with at least a threshold number of respective private key shares, ii) a respective ephemeral private key share of a shared ephemeral private key, iii) a first co-ordinate of an ephemeral public key corresponding to the shared ephemeral private key, and iv) a first common private key of a first hierarchical key structure, wherein each participant is associated with a respective participant index, and wherein the method is performed by a first participant of the group and comprises:

obtaining at least a threshold number of respective participant indexes, wherein the obtained respective participant indexes comprises a first participant index associated with the first participant;

generating a private key index, wherein the private key index is generated based on a hash of a combination of the obtained respective participant indexes;

generating a second common private key of the first hierarchical key structure, wherein the second common private key is generated based on the first common private key and a first hash value, wherein the first hash value is generated by inputting at least a) the first common private key or a corresponding public key, and b) the private key index into a hash function; and generating a first signature share of the digital signature, wherein the first signature share is generated based on a first ephemeral key share of the shared ephemeral private key, the message, the second common private key, the first co-ordinate of the ephemeral public key, and a first private key share of the shared private key.

20. A computer program embodied on non-transitory computer-readable storage media and configured so as, when run on one or more processors, to perform a method of generating a respective signature share of a digital signature for signing a message, wherein each participant of a group of participants has i) a respective private key share of a shared private key, wherein the shared private key can only be generated with at least a threshold number of respective private key shares, ii) a respective ephemeral private key share of a shared ephemeral private key, iii) a first co-ordinate of an ephemeral public key corresponding to the shared ephemeral private key, and iv) a first common private key of a first hierarchical key structure, wherein each participant is associated with a respective participant index, and wherein the method is performed by a first participant of the group and comprises:

obtaining at least a threshold number of respective participant indexes, wherein the obtained respective participant indexes comprises a first participant index associated with the first participant;

generating a private key index, wherein the private key index is generated based on a hash of a combination of the obtained respective participant indexes;

generating a second common private key of the first hierarchical key structure, wherein the second common private key is generated based on the first common private key and a first hash value, wherein the first hash value is generated by inputting at least a) the first common private key or a corresponding public key, and b) the private key index into a hash function; and generating a first signature share of the digital signature, wherein the first signature share is generated based on a first ephemeral key share of the shared ephemeral private key, the message, the second common private key, the first co-ordinate of the ephemeral public key, and a first private key share of the shared private key.

\* \* \* \* \*